United States Patent [19]

Chang et al.

[11] Patent Number: 4,513,091
[45] Date of Patent: Apr. 23, 1985

[54] HYDROTHERMAL ZEOLITE ACTIVATION

[75] Inventors: Clarence D. Chang, Princeton; Joseph N. Miale, Lawrenceville, both of N.J.

[73] Assignee: Mobil Oil Corporation, New York, N.Y.

[21] Appl. No.: 465,987

[22] Filed: Feb. 14, 1983

[51] Int. Cl.$^3$ .......................... B01J 29/28; B01J 37/08
[52] U.S. Cl. ........................................ 502/71; 502/77; 502/85
[58] Field of Search ............................... 502/71, 77, 85

[56] References Cited

U.S. PATENT DOCUMENTS

| | | | |
|---|---|---|---|
| 3,493,490 | 2/1970 | Plank et al. | 208/120 |
| 3,871,993 | 3/1975 | Morrison | 208/135 |
| 3,917,544 | 11/1975 | Michel | 502/64 |
| 4,312,790 | 1/1982 | Butter et al. | 252/455 Z |
| 4,374,296 | 2/1983 | Haag et al. | 502/77 X |
| 4,435,311 | 3/1984 | Sikkenga | 502/85 |

*Primary Examiner*—Carl F. Dees
*Attorney, Agent, or Firm*—Alexander J. McKillop; Michael G. Gilman; Dennis P. Santini

[57] ABSTRACT

In the process for activating high-silica zeolite catalyst with an ionized activating agent wherein a crystalline zeolite catalyst having a silica:alumina ratio greater than 70 and a constraint index of 1 to 12 is contacted with the activating agent at elevated temperature, an improvement which comprises: hydrothermally treating an intimate mixture of zeolite catalyst and an effective amount of activating agent in contact with an aqueous liquid phase under reaction conditions to increase the cracking activity of the catalyst.

The activated catalyst product may be produced by hydrothermal treatment of a composite mixture of zeolite and hydrated alumina or other activating metal oxide binder material. The preferred zeolites are acid ZSM-5 type crystalline materials having a silica:alumina ratio of at least 1600:1.

9 Claims, No Drawings

HYDROTHERMAL ZEOLITE ACTIVATION

FIELD OF THE INVENTION

This invention relates to a technique for increasing the catalytic activity of crystalline zeolites. In particular, a novel activation process is provided to enhance the α-value of high-silica ZSM-5 type catalysts by hydrothermal treatment in contact with an inorganic activating agent.

THE PRIOR ART

Zeolite catalysts have become widely used in the processing of petroleum and in the production of various petrochemicals. Reactions such as cracking, hydrocracking, alkylation, dealkylation, transalkylation, isomerization, polymerization, addition, disproportionation and other acid catalyzed reactions may be performed with the aid of these catalysts. Both natural and synthetic zeolites are known to be active for reactions of these kinds.

Recently, synthetic zeolites containing high proportions of silica relative to alumina have been developed and zeolites of this kind have shown themselves to be useful. U.S. Pat. No. 3,702,886 to Argauer et al discloses a class of crystalline aluminosilicates designated ZSM-5 which have highly advantageous properties. U.S. Pat. No. 3,941,871 and its Reissue U.S. Pat. No. Re. 29,948 to Dwyer et al disclose crystalline organosilicates which exhibit a structure, as evidenced by X-ray diffraction pattern, similar to that of ZSM-5, but with high ratios of silica relative to alumina. Materials of this kind are stated to exhibit low aging rates and to have low coke making properties when used in hydrocarbon processing.

Various treatments have been proposed in the past for modifying the activity of the zeolites, either by reducing it when too active or by increasing it when insufficient. One such treatment has been steaming and in the past it has generally been used to decrease the activity of the zeolite, as reported in "Fluid Catalytic Cracking with Zeolite Catalysts", Venuto and Habib, Marcel Dekker Inc., New York, N.Y. 1979.

The reduction of activity is not, however, necessarily undesirable because it may in certain circumstances be accompanied by an improvement in other characteristics of the zeolite, for example, resistance to aging. This fact has been exploited in certain processes, for example, in the alkylation process described in U.S. Pat. No. 4,016,218, which employs a zeolite catalyst which has been subjected to a prior thermal treatment either in an inert atmosphere or by steaming, to reduce its activity. The deactivation caused by the steam becomes more pronounced at higher temperatures and with longer reaction times.

It has also been found that steaming may in certain instances have beneficial effects upon the catalyst. U.S. Pat. No. 3,257,310, for example, describes a method for preparing a cracking catalyst of high activity and selectivity by steaming a zeolite for at least two hours at a specified temperature. The zeolites described in this patent include natural zeolites such as mordenite and faujasite and synthetic zeolites such as zeolites, X, Y and L.

U.S. Pat. Nos. 4,149,960 and 4,150,062 describe the use of water in the feedstock during operation to reduce coking and aging rates. U.S. Pat. No. 3,546,100 describes a method for maintaining the selectivity of a hydrocracking catalyst by restricting the partial pressure of water during the hydrocracking operation.

U.S. Pat. No. 3,493,519 describes a method of producing hydrothermally stable cracking catalysts by calcining zeolite-Y in the presence of steam, a process which was theorized to cause lattice aluminum defects which, after subsequent treatment by base exchange with ammonium salts, chelation and calcination in air produced the desired highly active product.

U.S. Pat. No. 3,493,490 describes a method for restoring the activity to used catalyst by controlled treatment with anionic reagents including water at high temperatures, even with catalysts which had initially been steamed to reduce their level of cracking activity, such as zeolites X and Y.

U.S. Pat. No. 3,758,403 describes a method for cracking hydrocarbon feedstocks using a mixture of zeolites including a ZSM-5 type zeolite and a large pore zeolite such as zeolites X, Y or L or faujasite. The selectivity of the catalyst is said to be improved by treatment with steam which if desired, may be carried out in the cracking unit itself.

Previous work in activation has shown substantial increases in activity for ZSM-5 type zeolites treated with aluminum halides or organo-aluminum complexes at elevated temperatures. Fluoride treatment at various pH levels has also been studied. Another zeolite activation technique employed steaming a high silica (1600:1 $SiO_2:Al_2O_3$) crystalline alumino-silicate acid ZSM-5 in intimate mixture with an activating metal oxide, such as α-alumina, at high temperature to achieve increased cracking activity.

SUMMARY OF THE INVENTION

A novel hydrothermal technique has been discovered for treating high-silica ZSM-5 zeolite catalysts to obtain enhanced catalytic activity. During treatment the zeolite is contacted with an activating agent in the presence of liquid water or other aqueous media at elevated temperature.

The activated catalyst composition may comprise an intimate mixture of zeolite and activating binder material or the hydrothermally activated zeolite may be recovered separately.

Accordingly, it is an object of the present invention to provide a zeolite catalyst composition having a silica:alumina ratio of at least 70 and a constraint index from 1 to 12 and said catalyst being treated with an activating agent at an elevated temperature in the presence of liquid water to substantially increase cracking activity of the catalyst. This catalyst composition may be made in composite form from high-silica ZSM-5 type crystalline zeolites by a method which comprises mixing the zeolite with an activating metal oxide; and contacting the mixture of zeolite and metal oxide with liquid water at elevated temperature under conditions to increase catalytic activity of the zeolite. This technique is particularly adapted for treating the zeolite in intimate mixture with about 10 to 90 weight percent of alumina binder based on composite weight in the presence of water. The activation process is used for treating various zeolites with an activating agent comprising at least one solid oxide selected from Group IIA, IVA, IIIB, VA, VB and VIIIA elements. The hydrothermal treatment may be carried out at a temperature of about 80° C. to 370° C., preferably about 150° to 200° C.

DESCRIPTION OF PREFERRED EMBODIMENTS

The zeolites which may be used in the present process have a silica to alumina ratio of at least 70 and preferably higher. It has been found that the degree of enhancement in the activity of the zeolite becomes greater as the silica to alumina ratio of the zeolite increases. Accordingly, the higher silica to alumina ratios are preferred and generally ratios of above 500:1. Marked enhancement of activity is obtained at ratios over 1600:1, for example, 26000:1. The silica to alumina ratio may be determined by conventional analysis. The ratio represents, as closely as possible, the ratio in the rigid anionic framework of the zeolite crystal i.e. the structural or framework silica:alumina ratio and excludes materials such as aluminum in binder or in another form within the channels of the zeolite. The ratio may be determined by conventional methods such as ammonia desorption/TGA.

The zeolites are also characterized by their Constraint Index, which is about 1 to 12. The Constraint Index is a measure of the constraint imposed by the crystal structure of the zeolite on the access by molecules of differing sizes to the internal structure of the crystal. A measure of such constraint is desired in order to obtain the desired conversions. It is sometimes possible to judge from a known crystal structure whether constrained access of this kind exists. For example, if the only pore windows in a crystal are formed by 8-membered rings of silicon and aluminum atoms, molecules with a cross-section larger than normal hexane will be excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be suitable.

The Constraint Index provides a convenient indication of the extent to which a zeolite provides this restrained access. A method for determining Constraint Index, together with values of the Index for exemplary zeolites, is described in U.S. Pat. No. 4,016,218 and J. Catalysis 67, 218–222 (1981) to which reference is made for details of the method. Because Constraint Index is a characteristic which is dependent upon the structure of the zeolite but is measured by means of a test which is dependent upon the cracking or acid activity of the zeolite, the test candidate should be representative of the zeolite in structure and have adequate cracking activity. Cracking activity may be varied by known artifices such as steaming, base exchange or variation of the silica:alumina ratio.

Zeolites which may be treated by the present activation process include ZSM-5, ZSM-11, ZSM-12, ZSM-23, ZSM-35, ZSM-38 and other similar materials having the appropriate characteristics. ZSM-5 is described in U.S. Pat. No. 3,702,886; ZSM-11 in U.S. Pat. No. 3,709,979; ZSM-12 in U.S. Pat. No. 3,832,449; ZSM-23 in U.S. Pat. No. 4,076,842; ZSM-35 in U.S. Pat. No. 4,016,245 and ZSM-38 in U.S. Pat. No. 4,046,859. These are the preferred zeolites and of these ZSM-5 is particularly preferred.

Highly siliceous forms of ZSM-5 are described in U.S. Pat. No. Re. 29,948, highly siliceous forms of ZSM-11 in U.S. patent applications Ser. Nos. 003,143 (now abandoned) and 003,145 (now abandoned), filed Jan. 15, 1979 and highly siliceous forms of ZSM-12 in U.S. patent application Ser. Nos. 003,144 (now abandoned) and 003,146, (pending) filed Jan. 15, 1979.

When the zeolites are prepared in the presence of organic cations they are initially catalytically inactive, possibly because the intracrystalline free space is occupied by organic cations from the forming solution. They may be activated by heating in an inert atmosphere at 1000° F. (538° C.) for one hour, for example followed by base exchange with ammonium salts followed by calcination at 1000° F. (538° C.) in air. The presence of organic cation in the forming solution may not be absolutely essential to the formation of the zeolite but these cations do appear to favor the formation of the desired crystal structure.

Natural zeolites may be hydrothermally treated by various activation procedures. Natural minerals which may be so treated include ferrierite, brewsterite, stilbite, dachiardite, epistilbite, heulandite, and clinoptilolite; however, other treatments may be required such as base exchange, steaming, alumina extraction and calcination.

According to a preferred aspect of the present invention, the preferred zeolites have a crystal framework density, in the dry hydrogen form, not substantially below about 1.6 g.cm$^{-3}$. The dry density for known structures may be calculated from the number of silicon plus aluminum atoms per 100 cubic Angstroms, as given e.g., on page 19 of the article on Zeolite Structure by W. M. Meier, including in "Proceedings of the Converence on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal.

Crystal framework densities of some typical zeolites are disclosed in European Patent Application No. 34444, corresponding to U.S. Pat. No. 4,326,994 which was issued on Apr. 27, 1982.

When it has been synthesized in the alkali metal form, the zeolite may be converted to the hydrogen form, generally by intermediate formation of the ammonium form by ammonium ion exchange and calcination of ammonium form to yield the hydrogen form. In addition to the hydrogen form, other forms of the zeolite wherein the original alkali metal has been reduced to less than about 1.5 percent by weight may be used. Thus, the original alkali metal of the zeolite or introduced hydrogen cations may be replaced by ion exchange with other suitable ions of Groups IB to VIII of the Periodic Table, including, by way of example, nickel, cadmium, copper, zinc, palladium, calcium or rare earth metals. It is normally preferred to use zeolites of large crystal size, that is, of about 0.1 microns or larger as opposed to small crystal zeolites of about 0.02 to 0.05 micron crystal size.

Particular emphasis here is placed on the use of composite materials for making activated catalysts. The zeolite may be composited with an activating metal oxide which is capable of activating the zeolite by the creation of additional active sites when the zeolite/oxide composite is steamed. Oxide activating agents can function as a binder for the zeolite. The preferred binder is hydrated alumina, preferably in the form of alpha alumina monohydrate or beta-alumina trihydrate; but other binders may also be used either on their own or in combination with alumina, for example, silica-alumina, silica-zirconia, silica-thoria, silica-berylia, silica-titania as well as ternary compositions, such as silica-alumina-thoria, silica-alumina-zirconia, silica-alumina-magnesia or silica-magnesia-zirconia. Other metal oxides which may be employed include titania, zirconia and chromia. Simple experiment may be employed to determine other useful materials.

In composite catalysts, the relative proportions of zeolite and activating binder may be adjusted in accordance with the silica to alumina ratio of the zeolite, with the zeolites of higher silica:alumina ratio being able to benefit more from a larger proportion of binder than those with a lower ratio. In general, the amount of binder can be from less than 10 to over 90 percent by weight of the combined zeolite and binder, preferably 20 to 80 percent by weight. A zeolite with a silica to alumina ratio of about 1600:1 is advantageously composited with 25 to 50 percent by weight of alumina binder, based on total solids weight.

The zeolite can be composited with the binder by intimately mixing by grinding or mulling the materials together, in the presence of water, after which the mixture is formed into suitable particles and dried. It has been found that greater enhancement of activity occurs if the zeolite and binders are intimately mixed together. The mixture of zeolite, binder and water may conveniently be formed into particles by extrusion using an extrusion press or, alternatively, other shaping methods may be used such as pelletizing or pressing. The amount of water is chosen as to give a mixture which has a satisfactory consistency for the forming step. The zeolite may contain sufficient occluded water or sufficient water may be present in the binder.

The zeolite may be treated to convert it to the desired form either before or after it is composited with the binder. Thus, if it is synthesized in the alkali metal form it may be converted to the hydrogen or another cationic form e.g. the alkali metal, alkaline earth metal or ammonium form before or after compositing with the binder. If conversion entails more than one step the requisite steps may, if desired, be carried out at different stages of the process, some before compositing and some after. Generally, however, the zeolite should be at least partly in the hydrogen form during the hydrothermal treatment or, alternatively, in a form which will be wholly or partly converted to the hydrogen form under the conditions employed during treatment. The ammonium form or the alkylammonium forms are readily converted at elevated temperatures.

After the zeolite/binder composite has been formed it is treated hydrothermally. During this step, the composite is held in an atmosphere entirely or partly of water vapor at an elevated temperature. Generally, it is preferred to operate with an atmosphere of 100% water vapor although partial atmospheres may also be used with some loss of effectiveness. If a gas other than steam is present it should be an inert gas such as nitrogen. The treatment should generally be continued for at least one hour and usually durations of several hours are required. A period of 12 to 48 hours under hydrothermal conditions is preferred.

The activity of the catalyst is measured in terms of its alpha value. The alpha value reflects the relative activity of the catalyst with respect to a high activity silica-alumina cracking catalyst. To determine the alpha value, n-hexane conversion is determined at a suitable temperature between about 550° F. to 1000° F. (288° to 538° C.), preferably at 1000° F. (538° C.). Conversion is varied by variation in space velocity such that a conversion level of up to about 60 percent of n-hexane is obtained and converted to a rate constant per unit volume of zeolite and compared with that of silica-alumina catalyst which is normalized to a reference activity of 1000° F. (538° C.). The catalytic activity of the catalyst is then expressed as multiple of this standard, i.e. the silica-alumina standard (first order rate constant $k=0.016$ sec.$^{-1}$). The silica-alumina reference catalyst contains about 10 weight percent $Al_2O_3$ and the remainder $SiO_2$. This method of determining alpha, modified as described above, is described in the Journal of Catalysis, Vol. VI, pages 278–287, 1966, to which reference is made for further details of the method.

The present hydrothermal activation process may be conducted under various treatment conditions. The elevated temperature of the liquid aqueous media is selected to provide adequate reaction rate. Although some activation is observed at moderately elevated temperatures of 80° C. to 100° C., the activation rate is quite slow. Generally, the treatment proceeds well at temperatures in the range of about 140° C. to 370° C. preferably about 150° C. to 200° C., using an enclosed pressure vessel to maintain at least the autogenous pressure up to about 17 atmospheres (1700 kPa).

Above the normal boiling point of the liquid, superatmospheric pressure is applied to maintain the aqueous media in the liquid phase. Where essentially pure water is employed, the autogenous pressure may vary from 1 atmosphere (101 kPa) at 100° C. to over 218 atmospheres at the critical temperature of water at 374° C. (736° F.). Above this temperature, pure water cannot be maintained in liquid phase.

While the reaction mechanism is not completely understood, it is believed that alumina or other activating agents are partially ionized at the liquid interface and are transported to the high-silica zeolite through the aqueous liquid phase during treatment at elevated temperatures. Nuclear magnetic resonance studies confirm that the aluminum is tetrahedrally bound in the zeolite structure. This chemical structure is known to provide acidic sites for catalytic activity in prior zeolite catalysts.

The activating agents employed herein are preferably solid inorganic compounds such as metal oxides, chalcogens, or mixtures of one or more activating agents, binders, etc. In addition to alumina, zeolite catalysts may be enhanced by hydrothermal treatment in contact with oxides or other compounds, of the following IUPAC periodic group elements: Group IIA (eg—Ca); IIIB (eg—B, Al); IVA (eg—Ti); VA (eg—V); VIA (eg—Cr, W); VIIIA (eg—Fe); VB (eg—P).

Under neutral conditions or acid pH, metal oxide-containing agents tend to form cationic species; however, amphoteric metals or other agents may be employed in the anionic form as well, especially in basic systems at pH greater than 7. The activating agent may be introduced as a borate, nitrate, silicate, phosphate, tungstate, chromate, aluminate, complex alkaline salt or other form ionizable under hydrothermal conditions.

The amount of activating agent employed in the treatment may be varied considerably within the inventive concept. Particular emphasis is placed on treatment with a solid metal oxide and this type of activation benefits from intimate contact between the solid activating agent and zeolite particles. Significant activity improvement is achieved where finely-divided solids are milled together with the aqueous liquid phase to provide a large contact area between the solid phases.

Typically, the weight ratio of zeolite to activating agent is about 10:1 to 1:10, based on dry solids. The amount of water maintained in the liquid phase in contact with the zeolite should be sufficient to completely wet the reactants and/or to fill interstitial voids in the composited solids. Wet milled composites provide both intimate solid to solid contact and thorough dispersion in the aqueous liquid phase.

In the following examples, high-silica zeolite is treated with a variety of activating agents and process conditions. Unless otherwise noted, the standard hydrothermal treating procedure employs equal parts by weight of activating agent and zeolite (1:1 ratio), a temperature of 165° C. to 170° C. and a one-day (24 hour) period. The standard zeolite is an acid ZSM-5 crystalline zeolite having a silica:alumina ratio of 26000:1 and hexane cracking activity ($\alpha$-value) of 0.02, as determined by a standard catalytic activity test. The ammonium form of the catalyst is composited with the activating agent by wet milling, air dried and further dried in a muffle furnace at 130° C. The composite mixture is calcined at 540° C. (1000° F.) to convert the ammonium form to HZSM-5 and then hydrothermally treated according to the standardized procedure. The activated catalyst is recovered, post-treated with ammonium nitrate to base-exchange the catalyst and calcined at 540° C. This post-treatment removes cationic surface materials which are not incorporated into the zeolite structure as tetrahedrally bound atoms, leaving active acid catalyst sites which have enhanced Bronsted acidity.

The apparatus employed comprises a steel autoclave equipped with temperature and pressure measuring devices and an internal sample support for holding open top test tubes, during treatment. A quantity of water is contained in the autoclave bottom, with test tubes being suspended in the liquid water. Each sample comprises the zeolite, activating agent and aqueous medium in predetermined amount. During the treatment the autoclave is heated to treatment temperature. The water vaporizes to form a saturated gas phase in equilibrium with the liquid phase at elevated temperature.

EXAMPLES 1 TO 7

ZSM-5 (65 parts by weight) is wet milled with $\alpha$-alumina monohydrate (35 parts) extruded into cylindrical pellets having a diameter of about 2 mm., dried, calcined and each sample is covered with water in an open tube. The products are exchanged with 1N $NH_4NO_3$ by conventional methods and calcined prior to testing. The results are tabulated below:

| Example No. | Temp. (°C.) | Time | Acid Activity ($\alpha$) | Notes |
|---|---|---|---|---|
| 1 | 165 | 1 day | 41 | — |
| 2 | 100 | 8 days | 4.5 | — |
| 3 | 170 | 1 day | 33 | $H_2O$ loss |
| 4 | 165 | 1 day | 195 | 1N.NaOH |
| 5 | 165 | 1 day | 72 | 0.2N NaOH |
| 6 | 25 | 1 day | 0.6 | 1N.NaOH |
| 7 | 173 | 14 hrs. | 23 | — |

EXAMPLES 8-10

The above procedure is repeated except that different samples are treated simultaneously in a sealed autoclave at 130° C. for 64 hours and then at 170° C. for 24 hours. Control example 8 contains no alumina and consists of HZSM-5 ($\alpha$=0.015). Example 9 in an extruded mixture of the particulate zeolite and alpha-alumina monohydrate binder in equal weight portions. Example 10 is an equal mixture of the zeolite with gamma-alumina beads slurried with water.

| Example No. | Alumina | Treatment | Activity ($\alpha$) |
|---|---|---|---|
| 8 | nil | none | 0.015 |
| 9 | binder | hydrothermal | 41 |
| 10 | beads | hydrothermal* | 7 |

*Loss of $H_2O$ indicated. Beads separated from treated zeolite prior to activity test.

This comparative experimentation shows the greater enhancement which is obtained by more intimate contact between the solid materials.

EXAMPLES 11 TO 15

The procedure of Example 10 is repeated using an admixture of HZSM-5 and $\gamma$-$Al_2O_3$ beads, except that the standard heating period is 1 day.

| Example No. | Temp. (°C.) | Activity | Note |
|---|---|---|---|
| 11 | 165 | 7 | — |
| 12 | 100 | 0.3 | — |
| 13 | 170 | 2 | $H_2O$ Loss |
| 14 | 165 | 0.5 | Steam Only |
| 15 | 165 | 81 | 1-N NaOH |

Examples 11, 13 and 14 show how hydrothermal treatment in contact with an aqueous liquid can improve activity markedly (14×), as compared to steaming, where the role of water as a transport medium is necessarily restricted. By fully covering the catalyst with water during hydrothermal treatment enhancement is maximized.

EXAMPLES 16 TO 29

A variety of activating agents are used to treat the HZSM-5 catalyst according to the standard procedure. Except as noted, equal parts by weight of zeolite and particulate activating agent are wet milled and treated in an excess of water at 165° C.

| Example No. | Act. Agent | Activity ($\alpha$) | Note |
|---|---|---|---|
| 16 | $B_2O_3$ | 0.8 | 170°, 0.5 parts |
| 17 | $NaAlO_2$ | 148 | 0.6 parts |
| 18 | $TiO_2$ | 1.3 | 0.5 parts |
| 19 | $Fe(NO_3)_3$ | 0.3 | 170° |
| 20 | $B_2O_3$ | 0.5 | 0.7 parts |
| 21 | $V_2O_5/SiO_2$* | 1.4 | 0.6 parts |
| 22 | $Na_3PO_4$ | 2.9 | 0.6 parts |
| 23 | $NH_4VO_4$ | 0.6 | 0.5 parts |
| 24 | $K_2CrO_4$ | 0.9 | 0.8 parts |
| 25 | $Na_2B_4O_7$ | 1.6 | 0.7 parts |
| 26 | $NaAlO_2$ | 27 | 0.1 parts $H_2O$ loss |
| 27 | $NaAlO_2$ | 223 | 0.5 parts |
| 28 | $Na_2WO_4$ | 1.1 | 0.7 parts |
| 29 | $Na_2B_4O_7$ | 1.1 | 0.1 parts |

*Girdler 101 catalyst K-promoted beads.

EXAMPLE 30

The alumina-HZSM-5 extruded composition of Examples 1–7 is ammonium exchanged and calcined. An aliquot of the alumina-bound catalyst is treated at 228° C. with flowing undiluted unpressurized stream for 20 hours and exchanged with 1N NH$_4$NO$_3$. The comparative results of several examples are given below.

| Example No. | Temp °C. | Pressure | Treatment | Time | Cat. Activity α |
|---|---|---|---|---|---|
| 2 | 100 | 1 atmo. | Hydrothermal | 8 days | 4.5 |
| 7 | 173 | 125 psi | Hydrothermal | 14 hours | 23 |
| 30 | 228 | 1 atmo. | steam | 20 hours | 1.6 |
| control | — | — | none | — | 1.4 |

The comparative data show that steaming at atmospheric pressure is substantially ineffective at 228° C.; whereas hydrothermal treatment in aqueous media shows significant increase in the α-value at only 100° C. and autogenous pressure.

EXAMPLE 31

The procedure of Example 1 is repeated except the hydrothermal treatment is conducted at 151° C. for 40 hours, giving an acid activity (α)=33.

The above data establishes the utility of the zeolite hydrothermal activation process for numerous different materials and process conditions. The unusually high alpha values obtained using alkaline conditions may be attributed to surface recrystallization of the zeolite during treatment. This is particularly noted in Examples 4, 5, 15, 17, 27, etc.

EXAMPLE 32

The standard hydrotreating procedure is followed except the zeolite employed is a crystalline borosilicate prepared by the method of U.S. Pat. No. 4,269,813 (Klotz). The zeolite is treated in admixture with gamma-Al$_2$O$_3$ beads at 205° C. for 18 hours. The cracking activity (α) of the zeolite is increased from 7 to 12.

Significant increases in the alpha value may be obtained with zeolites having a silica to alumina ratio of 1600:1 or more. Commensurate results may be obtained with other zeolites of differing silica to alumina ratio. The enhancement in activity is believed to be caused by the creation of additional, stable active internal sites in the zeolite because after the steaming treatment is complete, the Constraint Index remains consistent with that of the original zeolite structure although the alpha value has increased significantly. The catalyst therefore retains its original selectivity but with an improved acid activity.

The activated zeolite compositions produced by the present invention may be used as catalysts in acid catalyzed conversion reactions of the kind catalyzed by the type of zeolite used in the method. Hydrocarbon conversion reactions such as cracking, hydrocracking, alkylation, dealkylation, transalkylation, isomerization, polymerization, disproportionation and aromatization are particularly important but other reactions such as the conversion of oxygenates such as methanol or dimethyl ether to hydrocarbons are also of interest. The conditions employed in these reactions will be those appropriate to the particular catalyst being used, having due regard to its enhanced activity. The method is of particular utility for restoring activity to catalysts which have become inactivated during use.

While the invention has been described by specific examples and preferred embodiments, there is no intent to limit the inventive concept as set forth in the following claims.

What is claimed is:

1. A method for introducing tetrahedrally bound aluminun into the structure of a high silica content crystalline zeolite having a silica to alumina ratio of at least 70:1 and a Constraint Index of 1 to 12, which method comprises:

forming a mixture of said zeolite and an alumina; and
   hydrothermally treating said mixture with a dilute aqueous solution of sodium hydroxide at a temperature of about 80° C. to 370° C. and for a time effective to increase the tetrahedrally bound aluminum content of said zeolite.

2. The method described in claim 1 wherein said zeolite is ZSM-5.

3. The method described in claim 2 wherein said zeolite has a silica to alumina ratio above 500:1.

4. The method described in claim 2 wherein said zeolite has a silica to alumina ratio at least 1600:1.

5. The method described in claim 1 wherein said alumina is alpha alumina monohydrate.

6. The method described in claim 2 wherein said alumina is alpha alumina monohydrate.

7. The method described in claim 3 wherein said alumina is alpha alumina monohydrate.

8. The method described in claim 4 wherein said alumina is alpha alumina monohydrate.

9. The product formed by the method of claim 1 or 2 or 3 or 4 or 5 or 6 or 7 or 8.

* * * * *